United States Patent [19]
Sander

[11] Patent Number: 4,533,909
[45] Date of Patent: Aug. 6, 1985

[54] COMPUTER WITH COLOR DISPLAY

[75] Inventor: Wendell B. Sander, San Jose, Calif.

[73] Assignee: Apple Computer, Inc., Cupertino, Calif.

[21] Appl. No.: 560,529

[22] Filed: Dec. 12, 1983

Related U.S. Application Data

[60] Continuation of Ser. No. 394,801, Jul. 2, 1982, abandoned, which is a division of Ser. No. 150,630, May 16, 1980, Pat. No. 4,383,296.

[51] Int. Cl.³ ............................................. G09F 9/30
[52] U.S. Cl. ................................... 340/703; 340/803; 340/802
[58] Field of Search ............................. 340/701, 703

[56] References Cited
U.S. PATENT DOCUMENTS 4,136,359 1/1979 Wozniak ..................... 358/17
4,310,838 1/1982 Juso et al. .................... 340/701
4,360,804 11/1982 Ohura ......................... 340/703

Primary Examiner—David L. Trafton
Attorney, Agent, or Firm—Blakely, Sokoloff, Taylor & Zafman

[57] ABSTRACT

A microcomputer system with video display capability, particularly suited for small business applications and home use is described. The CPU performance is enhanced by permitting zero page data to be stored throughout the memory. The circuitry permitting this capability also provides a pointer for improved direct memory access. Through unique circuitry resembling "bank switching" improved memory mapping is obtained. 4-bit digital signals are converted to an AC chroma signal and a separate luminance signal for display modes. Display modes include high resolution modes, one of which displays 80 characters per line.

11 Claims, 9 Drawing Figures

COMPUTER WITH COLOR DISPLAY

This is a continuation of application Ser. No. 394,801 filed July 2, 1982, now abandoned, which is a divisional of application Ser. No. 150,630 filed May 16, 1980, now U.S. Pat. No. 4,383,296.

BACKGROUND OF THE INVENTION

The invention relates to the field of digital computers, particularly microcomputers, having video display capabilities.

Prior Art

In the last few years, there has been rapid growth in the use of digital computers in homes by hobbyists, for small business and for routine engineering and scientific application. For the most part, these needs have been met with self-contained, relatively inexpensive microcomputers or microprocessors with essential peripherals, including disc drives and with relatively easy to manage computer programs. The design of computers for these needs requires considerable ingenuity since each computer must meet a wide range of applications and because this market is particularly cost conscious.

A home or small business computer must, for example, operate with a number of different program languages, including those requiring relatively large memories, such as Pascal. The computer should interface with a standard raster scanned display and provide a wide range of display capabilities, such as high density alpha-numeric character displays needed for word processing in addition to high resolution graphics displays.

To meet these specialized computer needs, generally requires that a relatively inexpensive microprocessor be used and that the capability of the processor be enhanced through circuit techniques. This reduces the overall cost of the computer by reducing, for example, power needs, bus structures, etc. Another important consideration is that the new computers be capable of using programs developed for earlier models.

As will be seen, the presently described microcomputer is ideally suited for home and small business applications. It provides a wide range of capabilities including advanced display capabilities not found in comparable prior art computers.

The closest prior art computer known to applicant is commercially available under the trademark, Apple-II. Portions of that computer are described in U.S. Pat. No. 4,136,359.

SUMMARY OF THE INVENTION

A digital computer which includes a central processing unit (CPU) and a random-access memory (RAM) with interconnecting address bus and data bus is described. One aspect of the present invention involves the increased capability of the CPU by allowing base page or zero page data to be stored throughout the memory. Alternate stack locations and an improved direct memory access capability are also provided by the same circuitry. Detection means are used for detecting a predetermined address range such as the zero page. This detection means causes a special register (Z-register) to be coupled into the address bus. The contents of this Z-register provide, for example, a pointer during direct memory access, or alternate stack locations for storing data normally stored on page one.

The memory of the invented computer is organized in an unusual manner to provide compatibility with the 8-bit data bus and yet provide high data rates (16-bits/MHz) needed for high resolution displays. A first plurality of memory devices are connected to a first memory output bus; these memory devices are also connected to the data bus. The memory includes a second plurality of memory devices which are also connected to the data bus; however, the outputs of these second devices are coupled to a second output memory bus. First switching means permit the first and second memory buses to be connected to the display for high data rate transfers. Second switching means permit either one of the memory buses to be connected to the data bus during non-display modes.

The addressing capability of the memory is greatly enhanced not only through bank switching, but through a novel remapping which does not require the CPU control associated with bank switching. In effect, the "unused" bits from one of the first and second memory buses are used for remapping purposes. This mode of operation is particularly useful for providing toggling between two separate portions of the memory.

The display subsystem of the described computer generates video color signal in a unique manner. A 4-bit color code as used in the prior art, is also used with the described display subsystem. However, this code is used to generate an AC chrominance signal and a separate DC luminance signal. This provides enhanced color capability over similar prior art color displays.

BRIEF DESCRIPTION OF THE DRAWINGS

FIG. 2 is a circuit diagram primarily showing the address bus and the logic means associated with this bus. FIG. 3 is a circuit diagram primarily showing the data bus and its interconnection with the memory buses (A bus and B bus), bootstrap read-only memory, and input/output ports.

FIG. 4 is a circuit diagram primarily showing the circuitry for selecting between address signals from the address bus and display counter signals. FIG. 5 is a circuit diagram primarily showing the generation of various "select" signals for the memory devices. FIG. 6 is a circuit diagram showing the organization of the random-access memory and its interconnection with the data bus and memory output buses.

FIG. 7 is a circuit diagram showing the circuitry for generating the digital signals used for the video display. FIG. 8 is a circuit diagram of the circuitry used to convert the digital signals to analog video signals.

DETAILED DESCRIPTION OF THE INVENTION

A microcomputer system capable of driving a raster scanned video display is disclosed. In the following description, numerous specific details such as specific part numbers, clock rates, etc., are set forth to provide a thorough understanding of the present invention. However, it will be obvious to one skilled in the art that the inventive concepts described in this patent may be practiced without these specific details. In other instances, well-known circuits have been shown in block diagram form in order not to obscure the present invention in unnecessary detail.

Figure 1:
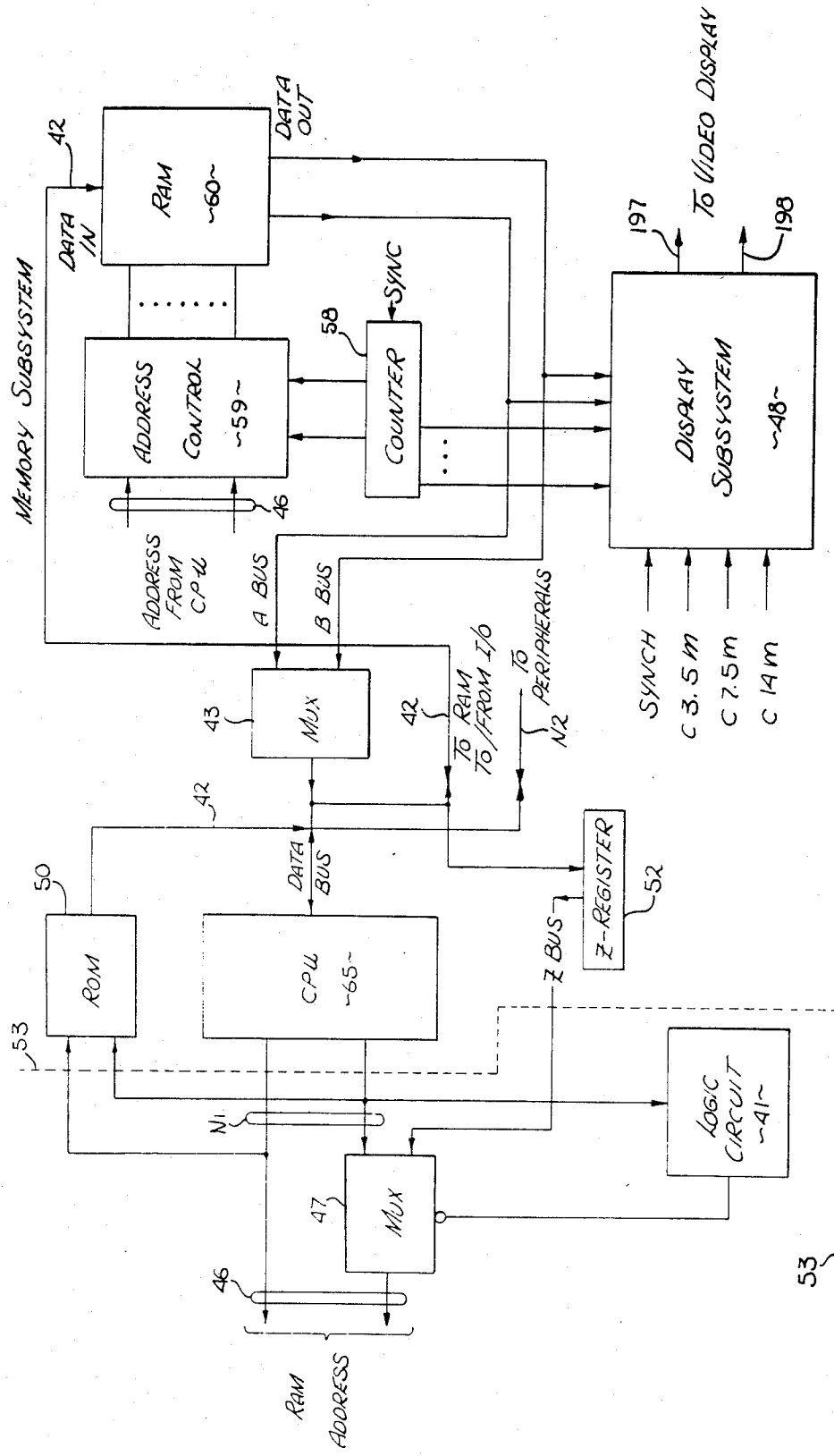
FIG. 1 is a block diagram showing the major components and subsystems of the invented and described microcomputer system.

Referring first to FIG. 1, in general the described computer includes a central processing unit (CPU) 65, its associated data bus 42, address bus 46 a memory subsystem and a display subsystem 58.

The address bus 46 from the CPU is coupled to the memory subsystem to permit the selection of locations in memory. Some of the address signals pass through a multiplexer 47. For some modes of operation, signals from a register 52 are coupled through the multiplexer 47 onto the bus 46. The register 52 is identified as the Z-register and is coupled to the multiplexer 47 by the Z bus. The general description of the multiplexer 47 and its control by the logic circuit 41 are described in detail in conjunction with FIG. 2. In general, the circuitry shown to the left of the dotted line 53 is included in FIG. 2 while the CPU 65, memory 50, data bus 42 and multiplexer 43 are shown in detail in FIG. 3.

The address bus N1 is coupled to the read-only memory 50. The output of this memory is coupled to the computer's data bus 42. The read-only memory (ROM) 50, as will be described, stores test routines, and other data of a general bootstrap nature for system initialization.

The data bus 42 couples data to the random-access memory (RAM) 60 and to and from I/O ports. This bus also couples data to the Z-register 52 and other commonly used registers not illustrated. The data bus 42 receives data from the RAM 60 through the A bus and B bus which are selected by multiplexer 43. The peripheral bus N2 is used, as is better illustrated in FIG. 3, for coupling to peripherals.

Figure 4:
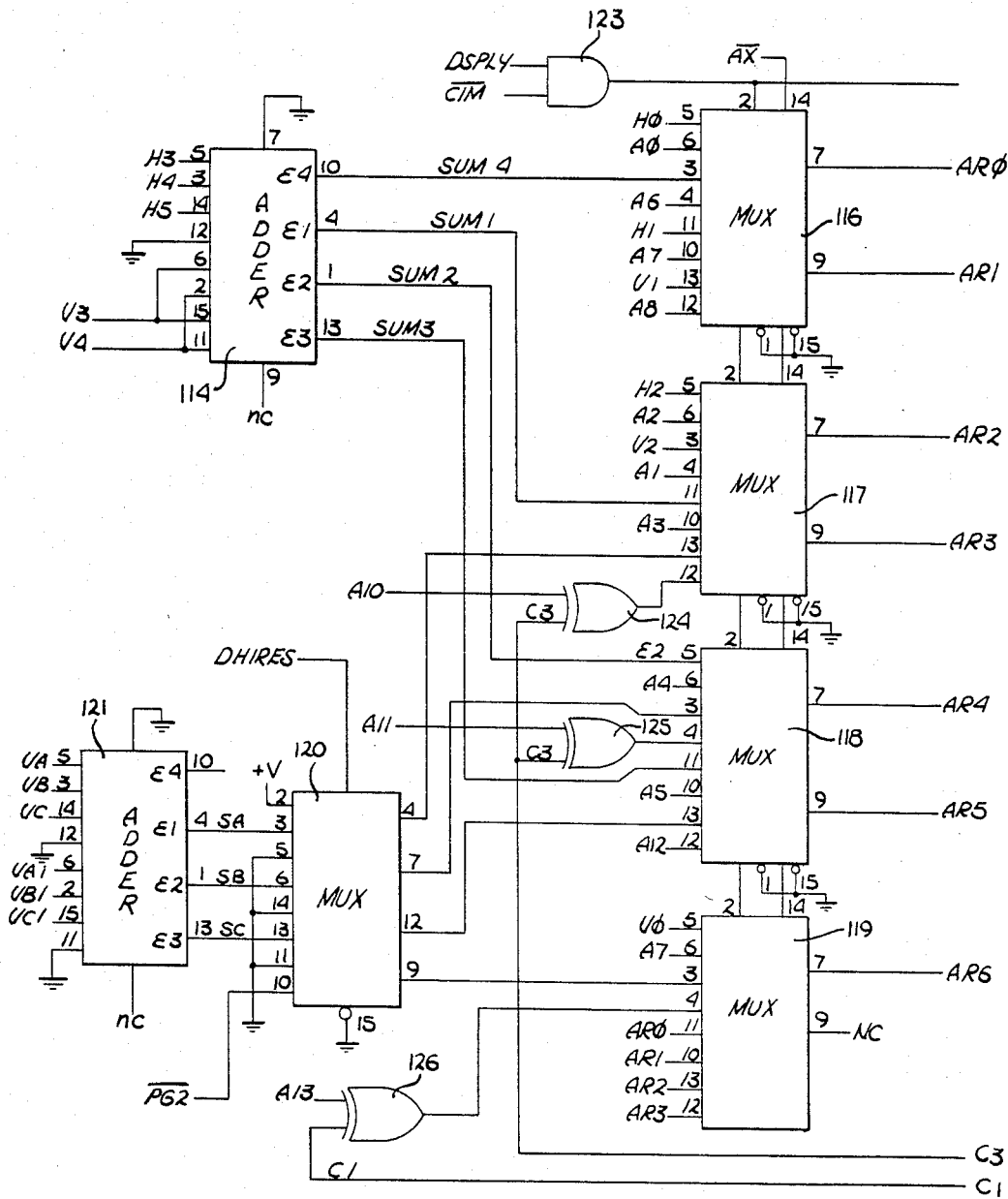
FIGS. 4, 5 and 6 show the memory subsystem.
Figure 5:
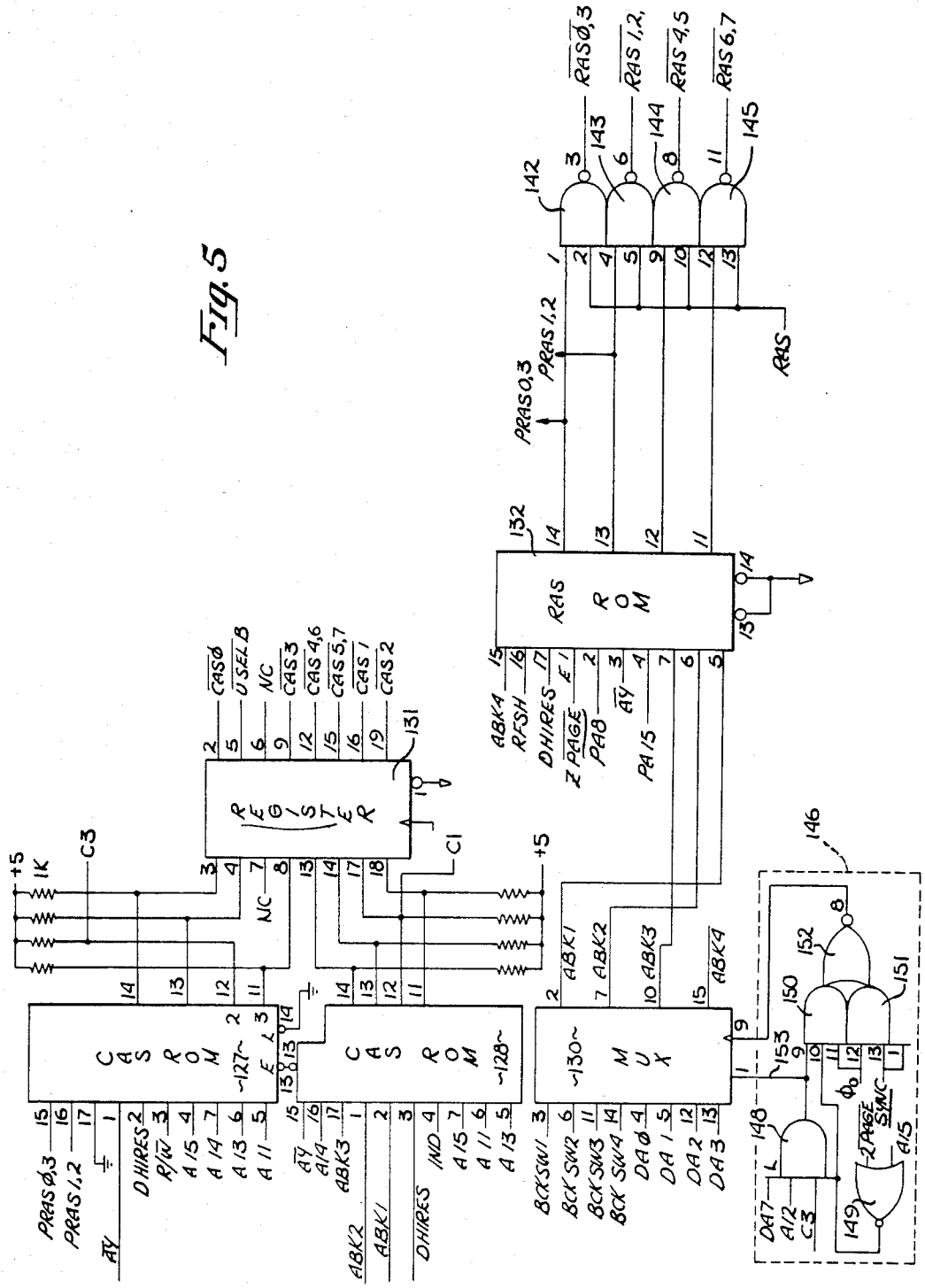
Figure 6:
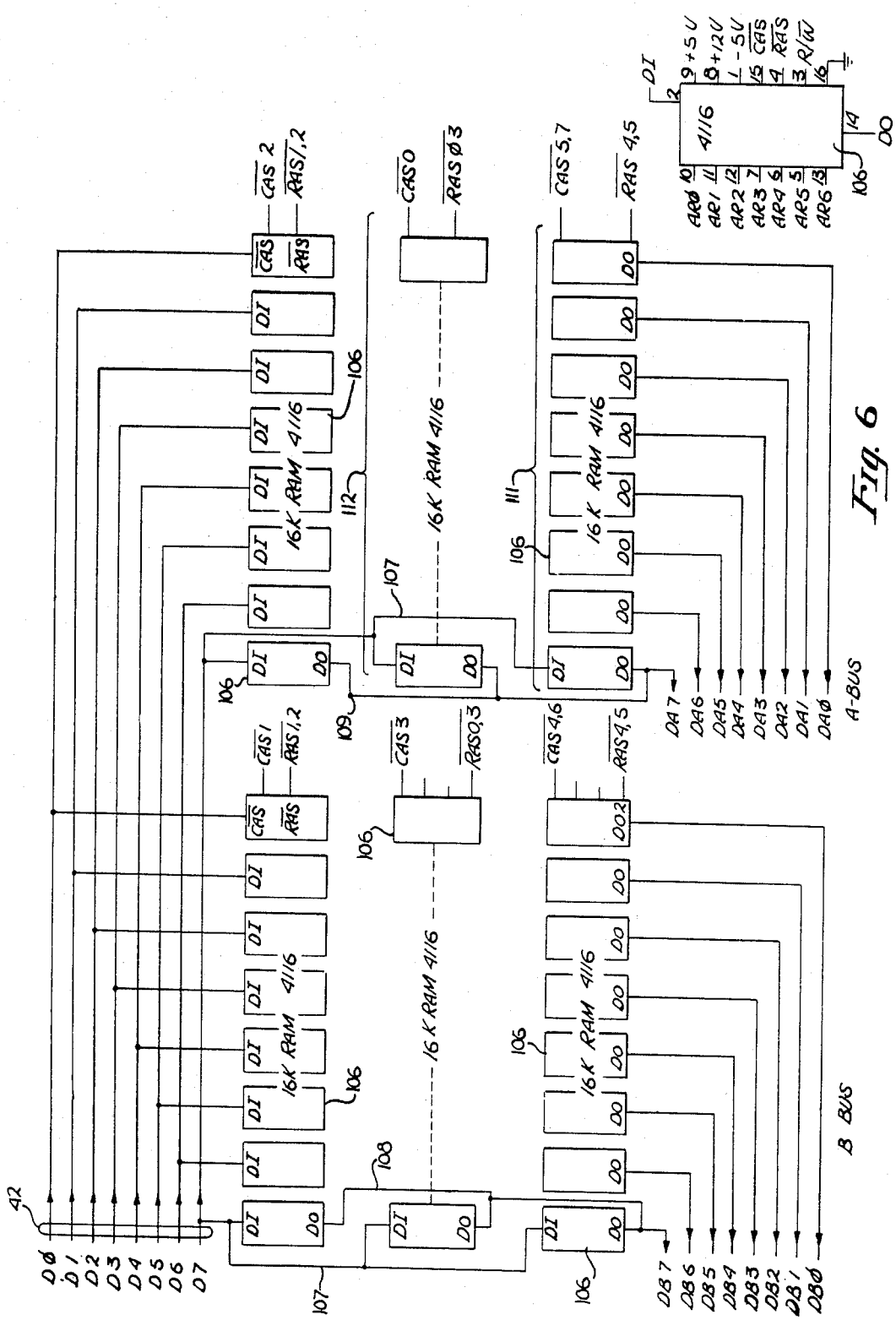

The memory subsystem is shown in detail in FIGS. 4, 5 and 6. The address control means which receives addresses on bus 46, makes the final selection of memory locations within the RAM 60. Bank switching, addressing for display purposes, scrolling and other memory mapping is controlled by the address control means 59 as will be described in greater detail in conjunction with FIGS. 4 and 5. The RAM 60 is shown in detail in FIG. 6. The counter 58 which is sychronized with the horizontal and vertical display signals, provides signals both to the address control means 59 and to the display subsystem 48.

The display subsystem receives data from the RAM 60 on the A bus and B bus and converts these digital signals to video signals which control a standard raster scanned display. A standard NTSC color signal is generated on line 197 and a black and white video signal on line 198. The same signals used to generate these video signals can be used to generate separate red, green, blue (RGB) video signals. The display subsystem 48 receives numerous timing signals including the standard color reference signal shown as 3.5 MHz (C3.5M). This subsystem is described in detail in FIGS. 7 and 8.

COMPUTER ARCHITECTURE

Figure 3:
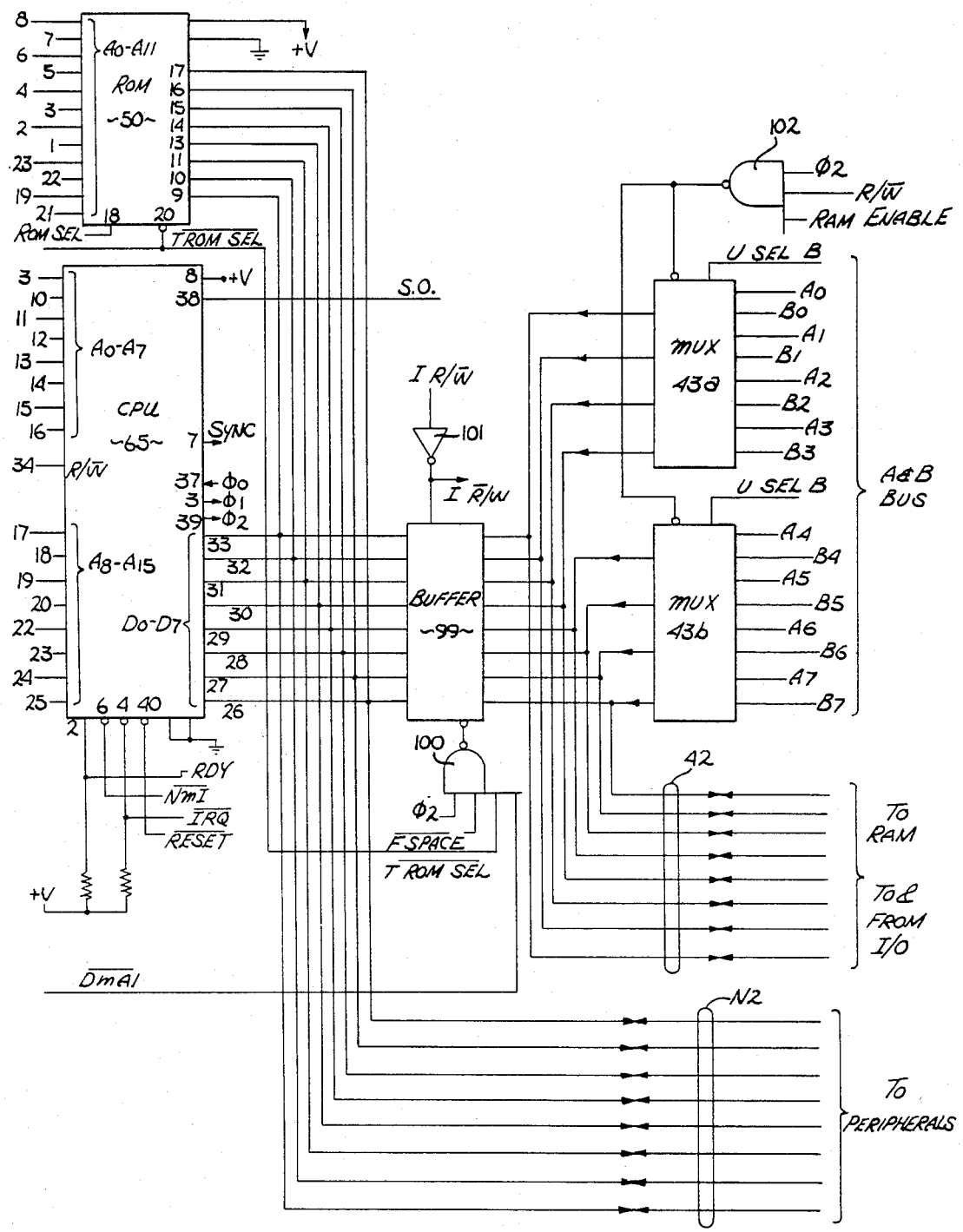

In the presently preferred embodiment, the CPU 65 (microprocessor) employed with the described computer is a commercially available component, the 6502A. This 8-bit processor (8-bit data bus) which has a 16-bit address bus is shown in FIG. 3 with its interconnections to the remainder of the computer. The pin number for each interconnection is shown adjacent to the corresponding line. In many cases, the nomenclature associated with the 6502A (CPU 65) is used in this application. For example, pin 6 receives the nonmaskable interrupt signal ($\overline{NMI}$), and pin 4 is coupled to receive the interrupt request signal ($\overline{IRQ}$). Some of the signals employed with the CPU 65, which are well-known in the art, and which are not necessary for the understanding of the present invention are not described in detail in this application, such as the various synchronization signals and clocking signals. The address signals from the CPU 65 are identified as $A_0$-$A_7$ and $A_8$-$A_{15}$. The data signals associated with the CPU 65 are shown as $D_0$-$D_7$. As will be apparent to one skilled in the art, the inventive concepts described in this application may be employed with other microprocessors.

Figure 2:
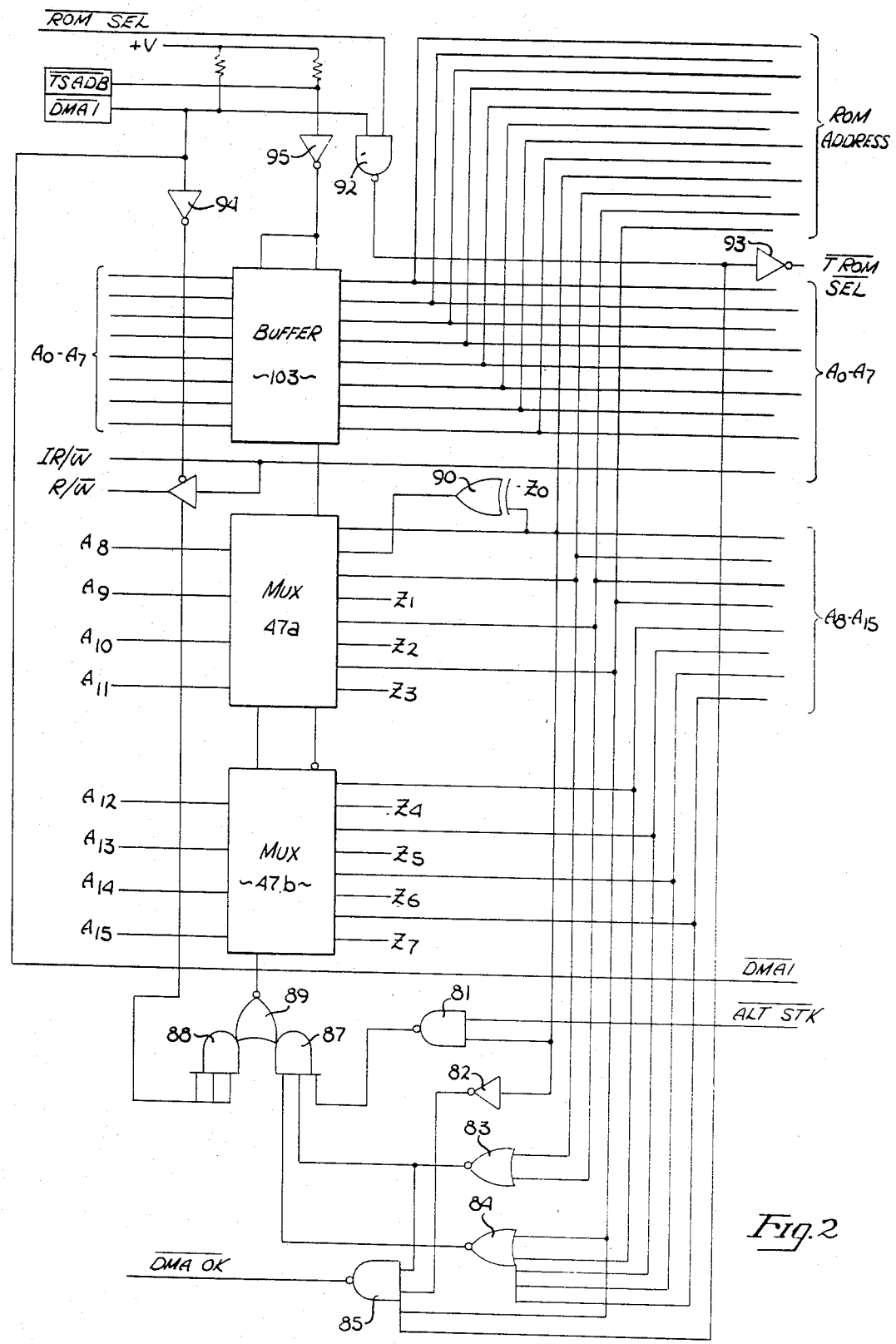
FIGS. 2 and 3 together show the central processing unit (CPU) and the architecture associated with this CPU, particularly the address bus and data bus.

Referring now to FIGS. 2 and 3, the general architecture, particularly the architecture associated with the CPU 65 can best be seen. The address signals $A_0$-$A_7$ are coupled to a buffer 103 by the bus shown primarily in FIG. 2. These address signals are also coupled to the ROM 50. The signals $A_0$-$A_7$ after passing through the buffer 103 are coupled to the memory subsystem. The address signals $A_8$-$A_{15}$ (higher order address bits) are coupled through lines shown in FIG. 2 to the multiplexers 47a and 47b. The contents of the Z-register 52 of FIG. 1 is also connected to the multiplexers 47a and 47b through the Z-bus ($Z_1$-$Z_7$). The multiplexers 47a and 47b allow the selection of either the signals $A_8$-$A_{15}$ from the CPU 65 or the contents of the Z-register ($Z_1$-$Z_7$) for addressing the RAM 60. The output of these multiplexers are shown as $A_8$-$A_{15}$; this designation is used even when the Z-bus is selected. Note in the case of the $Z_0$ signal, this signal is coupled to the multiplexer 47a through the exclusive OR gate 90 for reasons which are explained later. The address signals $A_8$-$A_{11}$ are also coupled to the ROM 50, thus the signals $A_0$-$A_{11}$ are used for addressing the ROM 50. The signals $A_8$-$A_{15}$ are connected to the logic circuit shown in the lower left-hand corner of FIG. 2; this logic circuit corresponds to the logic circuit 41 of FIG. 1.

The input and output data signals from the CPU 65 are coupled by a bidirectional bus to the bidirectional buffer 99 (FIG. 3). This buffer is selectively disabled by gate 100 to allow the output of ROM 50 to be communicated to CPU 65 and during other times not pertinent to the present discussion. The direction of flow through the buffer 99 is controlled by a read/write signal coupled to the buffer through inverter 101. Data from the CPU 65 is coupled through the buffer 99 and bus 42 to the RAM 60 or to I/O ports. Data from the RAM 60 is communicated to CPU 65 or bus N2 from the A bus and B bus through the buffer 99. The 4 lines of the A bus and 4 lines of the B bus are coupled to the multiplexer 43a. Similarly, the other 4 lines of the A and B buses are coupled to the multiplexer 43b. Multiplexers 43a and 43b select the 8 lines of the A bus or B bus and communicate the data through to buffer 99 and bus 42. These multiplexers are selectively disabled (for example, during writing) by gate 102. As will be described later, the 16 lines of the A bus and B bus permits the reading of 16-bits from the RAM at one time. This provides a data rate of 16-bits/MHz which is necessary, for example, for an 80 character per line display. The data is loaded into the RAM 60, 8-bits at a time.

The ROM 50, as mentioned, stores test programs, data needed to initialize various registers, character generation data (for RAM 162 of FIG. 7) and other related data. Specific programs employed in the presently preferred embodiment of the computer are set forth in Table 1 of U.S. Pat. No. 4,383,296. The ROM 50 is selected by control signals coupled to its pins 18 and 20, identified as signals ROM SEL and $\overline{\text{T ROM SEL}}$. Any one of a plurality of commercially available read-only memories may be used for the ROM 50. In the presently preferred embodiment, commercially available Part No. SY2333 is used.

Referring now to this logic circuit (lower left-hand corner of FIG. 2), the NAND gate 81 receives the address signal $A_8$ and also the alternate stack signal identified as $\overline{\text{ALT STK}}$. The output of this gate provides one input to the AND gate 87. The $A_8$ signal is also coupled through the inverter 82 to one input terminal of the NAND gates 85 and 86. The address signals $A_9$ and $A_{10}$ are coupled to the input terminals of the NOR gate 83. The output of this gate is coupled to one input terminal of the NAND gates 85 and 86 and the AND gate 87. The address signals $A_{11}-A_{15}$ are coupled to the input terminals of the NOR gate 84. The signal $A_{11}$ is also coupled to an input terminal of the NAND gate 85.

The outputs of the AND gates 87 and 88 (through NOR gate 89), controls the multiplexers 47a and 47b. When the output of gate 89 is low the Z-bus is selected, otherwise the address signals from the CPU 65 are selected.

The logic circuit above-described, along with the Z-bus and Z-register provide enhanced performance for the computer. First, this circuit permits the zero page or base page data to be stored throughout the RAM 60 rather than just on zero page. Secondly, this circuit enables addressing of alternate stack locations (other than page one). Lastly, this circuit through the Z-register provides a RAM pointer for direct memory access (DMA).

Assume for purposes of discussion that the CPU 65 is addressing the zero page of memory. That is, the higher order address bits $A_8-A_{15}$ are all zeros. The zeros for $A_9-A_{15}$ are detected by the gates 83 and 84. If all the inputs to these gates are zeros, the outputs of these gates are high which condition is communicated to the gate 87. $A_8$ which is also low, insures that the output of gate 81 will be high. Thus, all the inputs to gate 87 are high, causing the signal at the output of the gate 89 to drop. When this occurs, the Z-bus is selected. Instead of all the binary zeros from the CPU being coupled to the main memory (RAM 60), the contents of the Z-register form part of the address for the memory. Therefore, even though the CPU 65 has selected the zero page, nonetheless data may be written into or from any location of RAM 60 (including the zero page). This enhances the performance of the CPU, since for example, the time consumed in shifting data to and from a single zero page is minimized.

Normally, the CPU 65 selects page one for stack locations. This occurs when $A_8$ is high and $A_9-A_{15}$ are low. Assume first that the alternate stack locations have not been selected. Both inputs to gate 81 are high and its output is low. The low input to the gate 87 prevents the selection of the Z-bus. Thus, for these conditions the address signals $A_0-A_7$ select stack locations on page one.

Next assume that page one has been selected by the CPU and that the $\overline{\text{ALT STK}}$ signal is low, indicating the alternate stack locations are to be selected. (A flag is set by the CPU to change the $\overline{\text{ALT STK}}$ signal). Since the $\overline{\text{ALT STK}}$ signal is low and $A_8$ is high, a high output occurs from the gate 81. All the inputs to gates 83 and 84 are low, therfore, high outputs occur from both these gates. The conditions of gate 87 are met, causing a high output from this gate and lowering the output from the gate 89. The Z-bus is thus selected by the multiplexers 47a and 47b. This allows the contents of the Z-register to be used as alternate locations. Non-zero page locations are assured by inverting $A_8$. The exclusive OR gate 90 acts as a selective inverter. If $A_8$ is high and $Z_0$ is low, then $A_8$ at the output of the multiplexer 47a will be low. Note that during zero page selection when $A_8$ is low, the $Z_0$ signal is directly communicated through gate 90 to the output of multiplexer 47a.

Thus, the logic circuits along with the $\overline{\text{ALT STK}}$ signal allows alternate stack locations to be selected through the Z-bus. This further enhances the performance of the CPU which would otherwise be limited to page one for stack locations.

The logic circuit of FIG. 2 is also used along with the Z-register to provide a pointer during direct memory access (DMA). Assume that direct access to the computer's memory is required by a peripheral apparatus. To initiate the DMA mode the CPU provides an address between F800 and F8FF. Through a logic circuit not illustrated in FIGS. 2 and 3, the $\overline{\text{ROM SEL}}$ signal is brought low for addresses between F000 and FFFF. This signal is communicated to gate 93 and causes the output of gate 92 to rise ($\overline{\text{DMA1}}$ is high at this time). This rise in potential is communicated to one input of the gate 85. Additionally, gate 85 senses that the address bits $A_8$, $A_9$ and $A_{10}$ are low. This information is coupled to gate 85 through the inverter 82 and the NOR gate 83 as high signals. Also the fact that $A_{11}$ is high is directly communicated to gate 85. Thus with the address between F800 and F8FF the $\overline{\text{DMA OK}}$ signal drops in potential. This is sensed by the peripheral apparatus which in turn causes the $\overline{\text{DMA 1}}$ signal to drop and provides a ready signal to the CPU 65. With the completion of this handshake, data may begin to be transferred to the RAM.

The $\overline{\text{DMA 1}}$ signal through gate 93 and inverter 93 forces the $\overline{\text{T ROM SEL}}$ signal low. This signal in addition to being communicated to the ROM 50, is coupled to the buffer 99 through gate 100, disabling this buffer (during the reading of ROM 50). Also, the ready signal causes the CPU to come to a hard stop. Importantly, the $\overline{\text{DMA 1}}$ signal, after passing through the inverter 94 and the gates 88 and 89, assures the selection of the Z-register. The contents of the Z-register are fixed and provide a pointer to a page in the RAM.

Under the above conditions, the CPU increments the lower 8-bits of the address signal. The ROM 50 furnishes the instructions for incrementing the address, specifically SBC #1 and BEQ. The peripheral apparatus provides the data or receives the data in synchronization with the CPU operation. The peripheral also furnishes a read/write signal to indicate which operation is to occur. Data is then written into RAM via bus N2 and bus 42, or read from RAM via the A and B buses and bus N2.

Importantly, with the above DMA arrangement, addresses from the peripheral apparatus are not necessary and the Z-register is used to provide a pointer to a page in RAM 60.

MEMORY SUBSYSTEM

The memory subsystem shown in FIG. 1 as the address control means 59 and RAM 60 is illustrated in detail in FIGS. 4, 5 and 6 as mentioned. In FIGS. 4 and 5, the memory control means is shown, while in FIG. 6 the memory devices and their organization are illustrated. The address control means of FIGS. 4 and 5 receives the address signals from the CPU 65 ($A_0$-$A_{15}$), the count in the vertical and horizontal counters (counter 58 of FIG. 1) which are used during display modes, control signals from the CPU and other signals. In general, this control means develops the address signals which are coupled to the RAM of FIG. 6 including the column address and row address signals, commonly referred to as $\overline{CAS}$ and $\overline{RAS}$. Other related functions are also shown in FIGS. 4 and 5, such as the circuitry which provides display scrolling, indirect RAM addressing and memory mapping.

The CPU 65 of FIG. 3 provides a 16-bit address for addressing the memory. Under ordinary circumstances this address limits the memory capacity to 64 K bytes. This size memory is insufficient in many applications, as for example, to effectively use the Pascal program language. As will be described in greater detail, the address control means of FIGS. 4 and 5 enable the use of a memory having a 96K byte or 128K byte capacity. One well-known technique which is used with the present invention for increasing this capacity is bank switching; this switching occurs under the control of the CPU. In addition, the address control means uses a unique indirect addressing mode which provides the benefits of bank switching, however, this mode does not require CPU control. This greatly enhances CPU operation with the larger memory (as will be described) when compared to the CPU controlled bank switching.

Referring first to FIG. 6, the RAM configuration is illustrated for a capacity of 96K bytes. The memory is organized into six rows, each of which includes eight 16K memory devices such as rows 111 and 112. In the presently preferred embodiment, Part No. 4116 MOS dynamic RAMs are used. (The pin designations and signal designations refer to this memory device.) Obviously, other memory devices may be employed.

Input data to these memory devices 106 is provided from the bus 42. Each line in the bus 42 is connected to the data input terminal of one device 106 in each row. The interconnection of this bus with each of the memory devices is not shown in FIG. 6 in order not to overcomplicate this drawing. By way of example, however, line 107 connects the data bit D7 to the data input terminal of one of the memory devices in each of the six rows.

Three rows of devices 106 have their output terminals coupled to the A bus, and three rows are similarly coupled to the B bus. By way of example, line 108 connects three output terminals of devices 106 to the DB7 line of the B bus while line 109 connects three output terminals of the devices 106 to the DA7 line of the A bus.

The described memory devices 106 are each organized as a 16KX1 memory. Thus, each device receives a 14-bit address which is time multiplexed into two, 7-bit addresses. This multiplexing occurs under the control of the $\overline{CAS}$ and $\overline{RAS}$ signals as is well-known. The lines coupling the address signals to each of the devices in FIG. 6 are not illustrated. However, in the lower right-hand corner of FIG. 6, the various signals applied to each device (including the address signals), along with the corresponding pin numbers are shown. Other circuitry not illustrated is the refresh control circuitry which operates in a well-known manner in conjunction with the $\overline{CAS}$, $\overline{RAS}$ and address signals to refresh the dynamic devices.

Each row of memory devices 106 receives a unique combination of $\overline{CAS}$ and $\overline{RAS}$ signals. For example, row 111 receives $\overline{CAS}$ 5, 7 and RAS 4, 5; similarly, row 112 receives $\overline{CAS}$ 0 and RAS 0, 3. The generation of these $\overline{CAS}$ and $\overline{RAS}$ signals is described in conjunction with FIG. 5. These signals (along with the 14-bit address signals) permit the selection of a single 8-bit location in the 96K byte memory (for writing) and also the selection (for reading) of 16-bit locations.

The memory of FIG. 6 may be expanded to a 128K byte memory by using 32K memory devices, such as Part No. 4132. In this case, four rows of eight, 32K memory devices are used with each row receiving two $\overline{CAS}$ and $\overline{RAS}$ signals.

Before reviewing FIG. 4, a general understanding of the organization of the display is helpful. The display, during certain modes, is organized into 80 horizontal segments and 24 vertical segments for a total of 1920 blocks. 11-bits of the counter 58 of FIG. 1 are used as part of the address signals for the memory to access data for displaying during these modes. These counter signals are shown in FIG. 4 as $H_0$-$H_5$ and $V_0$-$V_4$. During other display modes each horizontal segment is further divided into 8 segments (e.g. for displaying 80 alpha numeric characters per line). This requires 3 additional vertical timing signals shown as $V_A$, $V_B$ and $V_C$ in FIGS. 4 and 7.

Often in the prior art, two separate counters are used to supply the timing/address signals for accessing a memory when the data in the memory is displayed. The count in one counter represents the horizontal lines of the screen (vertical count) and the other the position along each line, (horizontal or dot count). In many prior art displays the most significant bit of the dot counter is used to increment the line counter. Data in memory intended for display is mapped with a one-to-one correlation to the counts in these counters. In another prior art system (implemented in the Apple-II computer sold by Apple Computer, Inc.) this one-to-one correlation is not used. Rather, to conserve on circuitry, a single counter is employed and a more dispersed mapping is used in the memory. (Note that where a maximum horizontal count of 80 is used, this number cannot be represented by all ones in a digital counter and thus the vertical counter cannot easily be incremented by the most significant bit in the horizontal counter.) Since this more dispersed mapping technique is part of the prior art and not critical to an understanding of the present invention, it shall not be described in detail. However, the manner in which it is implemented shall be discussed in conjunction with the adder 114 of FIG. 4. For purposes of discussion, the signals from the counter 58 of FIG. 1 are designated as either vertical (V) or horizontal (H).

Referring now to FIG. 4, the selection of either the counter signals on the address signals from the CPU is made by the multiplexers 116, 117, 118 and 119. Each of these commercially available multiplexers (Part No. 153) couples one of four input lines to an output line. There are eight inputs to multiplexers 116, 117 and 118 and the outputs of these multiplexers provide the address signals for the memories (AR0 through AR5). The multiplexer 119 has four inputs on its pins 3, 4, 5, 6 and provides a single output on pin 7, the AR6 address signal. (The signals supplied to pins 11, 12 and 13 of multiplexer 119 are for clamping purposes only.)

The $\overline{AX}$ signal is applied to the pin 14 of each of the multiplexers. The signal on this line and the signal applied to pin 2, determines which of the four inputs is coupled to each of the outputs of the multiplexers. The $\overline{AX}$ signal is a RAM timing signal for clocking the first 7 bits and second 7 bits of the multiplexed 14-bit address applied to each of the memory devices 106. The other control signal to the multiplexers is developed through the AND gate 123. The inputs to this gate are the display signal (DSPLY) which indicates that the computer is in a display mode and a clocking signal, specifically a 1 MHz timing signal ($\overline{CIM}$). The output of the AND gate 123 determines whether the address signals from the CPU or the signals associated with the counter 58 of FIG. 1 are selected.

Assume for purposes of discussion that the display has not been selected, and thus, the output of gate 123 is low. The $\overline{AX}$ signal then selects for pin 7 of multiplexer 116 first the address signal $A_0$ and then $A_6$. Likewise, each of the multiplexers selects an address signal (except for those associated with exclusive OR gates 124 and 125 which shall be discussed). If the display signal is high and an output is present from the gate 123, then, by way of example, the $\overline{AX}$ signal first causes the $H_1$ signal and then the $V_1$ signal to be connected to the AR1 address line. Similarly, signals corresponding to the vertical and horizontal count are coupled to the other address lines during display modes.

The adder 114 is an ordinary digital adder for adding two 4-bit digital nibbles and for providing a digital sum signal. A commercially available adder (Part No. 283) is employed. The carry-in terminal (pin 7) is grounded and no carry-outs occur since one of the inputs (pin 12) is grounded. The adder sums the digital signal corresponding to $H_3$, $H_4$ and $H_5$ with the digital signal corresponding to $V_3$, $V_4$, $V_3$, $V_4$. The resultant sum signal is coupled to the multiplexers 116, 117 and 118 as illustrated. The summing of these horizontal and vertical counter signals is used to provide the more dispersed mapping as previously discussed.

The adder 121 is identical to adder 114 and is coupled to sum the three least significant vertical counter bits from the counter 58 (FIG. 2) with the signals VA1, VB1 and VC1. The sum is selected by the multiplexer 120 during the high resolution display modes and also during scrolling as will be described. These sum signals are coupled to the multiplexers 117, 118 and 119. During the low resolution display modes, the multiplexer 120 couples ground signals or the page 2 signal ($\overline{PG2}$) to the multiplexers 117, 118 and 119. (The $\overline{PG2}$ signal is used for special mapping purposes, not pertinent to the present invention.) During the high resolution modes when the display is not being scrolled, the VA1, VB2 and VB3 signals are at ground potential and thus no summing occurs within adder 121 and the VA, VB and VC signals are coupled directly to the multiplexers 117, 118 and 119.

The address signals $A_{10}$, $A_{11}$, and $A_{13}$ from the CPU are coupled to the multiplexers 117, 118 and 119, respectively, through exclusive OR gates 124, 125, and 126, respectively. The other input terminals to gates 124 and 125 receive the $C_3$ signal, while the other input terminal of the gate 126 receives the $C_1$ signal. (The development of the $C_1$ and $C_3$ signals is illustrated in FIG. 5.) The gates 124, 125 and 126 provide mapping compensation within the memory. As the computer and memory are presently implemented, the sequence in which the various portions of the display are generated is not the same as the sequence in which the data is removed from memory for display. These gates provide compensating addresses and, in effect, cause a remapping so that the proper sequence is maintained when data is read from the memory for the display. These gates are shown to provide a complete disclosure of the presently preferred embodiment, however, they are not critical to the present invention.

In operation, the circuitry of FIG. 4, as mentioned, selects the address signals which are applied to each of the memory devices, either from the CPU or counter if the display mode is selected. It should be noted that not all of the address bits from the CPU are coupled to the multiplexers 116 through 119. Some of these address bits, as will be described in conjunction with FIG. 5, are used to develop the various $\overline{CAS}$ and $\overline{RAS}$ signals and thus select different rows within the memory of FIG. 6.

The scrolling operation which is used is somewhat unusual in that each line of the display is separately moved up (line-by-line) with one line of data in memory being moved for each frame. This technique provides a uniform, esthetically pleasing, scroll. Scrolling the screen one line per frame can be achieved by moving all the data in the memory into a new position for each frame. This would be very time consuming and impractical. With the described technique, only one-eighth of the data in the memory is moved for each new frame.

Referring to the adder 121, as mentioned, the signals $V_A$, $V_B$ and $V_C$ are the three least significant vertical counter bits from the counter 58. These bits or counts, by way of example, represent the 8 horizontal lines of each character. In adder 12, a 3-bit digital signal, VA1, VB1 and VC1, is added to the count from counter 58. This 3-bit signal is constant during each frame, however, it is incremented for each new frame.

During a first frame, 000 is added to the vertical count. During a second frame, 001 is added; and during a third frame 010 is added, and so on. By adding this digital signal to the count from counter 58, the addresses to the memory are changed in the vertical sense. During the first frame when 000 is added, the display remains unaffected. During the next frame, when 001 is added to the vertical count, instead of first displaying the first line of a character, the second line of each character is displayed at the top of each character space and each subsequent line of the character is likewise moved up one line. If data in memory is not moved, the first line of the character would appear at the bottom of each character. Note when 001 is added to 111 from the counter, 000 results. Thus, the first line of characters would be addressed when the beam is scanning the eighth line of characters. To prevent this, the data corresponding to the first line of each character is moved in memory for this frame. The first line of one character is moved up and becomes the bottom line of the character directly above it. When 010 is added, the process is again repeated. For example, the third line of each character is first displayed in each character space and the second line of each character is moved up to become the bottom line of the character directly above it. This process is repeated to scroll the data. The movement of data in memory is controlled by the CPU in a well-known manner.

Thus, through use of adder 121, an even, continuous scroll is obtained without moving all the data in memory for each frame. Rather, only ⅛th of the data is moved for each frame.

Referring now to FIG. 5, the circuitry used to extend the addressing from the CPU is illustrated. In general, the $\overline{CAS}$ signals are generated by the ROMs 127 and 128. The $\overline{RAS}$ signals are generated by the ROM 132. The multiplexer 130 allows the selection of either the bank switching signals, or the unique indirect addressing mode when "bank switching" occurs without direct commands from the CPU.

The CAS ROM 127 receives as an address the following signals: PRAS , $\phi$3, PRAS 1,2, $\overline{AY}$, DHIRES, R/$\overline{W}$, $A_{11}$, $A_{13}$, $A_{14}$, and $A_{15}$. As the PRAS$\phi$, 3 and PRAS 1, 2 represent the RAS signals being used. These signals are high when the respective RAS signal is active. As previously mentioned, the AY signal is high for display modes and the DHIRES signal is high for high resolution display modes. The CAS ROM 128 receives as address signals the ABK1, ABK2, and ABK3 signals and also DHIRES, $\overline{AY}$, IND, $A_{11}$, $A_{13}$, $A_{14}$, and $A_{15}$.

The ROMS 127 and 128 are programmed to implement the following equations.

$$\overline{PCAS0} = (PRAS0, 3 \cdot (\overline{DHIRES} \cdot \overline{AY} + AY \cdot (\overline{A15} \cdot \overline{A14} \cdot \quad (1)$$
$$\overline{A13} \cdot \overline{A11} \cdot R/WN + \overline{A15} \cdot \overline{A14} \cdot \overline{A13} \cdot R/WN + A15 \cdot$$
$$\overline{A14} \cdot A13 + A15 \cdot A14 \cdot A13 \cdot \overline{A11})))$$

$$\overline{PCAS2} = (DHIRES \cdot \overline{AY} + AY \cdot (\overline{ABK1} \cdot \overline{ABK2} \cdot \overline{ABK3} \cdot \quad (2)$$
$$\overline{IND} + ABK1 \cdot ABK2 \cdot ABK3) \cdot (\overline{A15} \cdot A14) + AY \cdot IND \cdot$$
$$\overline{ABK1} \cdot \overline{ABK2} \cdot \overline{ABK3} \cdot \overline{A15} \cdot (\overline{A14} \cdot A13 + A14 \cdot \overline{A13}))$$

$$PCAS3 = (PRAS0, 3 \cdot (\overline{DHIRES} \cdot \overline{AY} + AY \cdot (\overline{A15} \cdot \overline{A14} \cdot \quad (3)$$
$$\overline{A13} \cdot A11 + A15 \cdot A14 \cdot \overline{A13} \cdot \overline{A11} + A15 \cdot A14 \cdot \overline{A13})))$$

$$\overline{PCAS4,6} = (AY \cdot \overline{IND} \cdot \overline{ABK3} \cdot \overline{A15} \cdot (ABK1 \cdot \overline{ABK2} + \quad (4)$$
$$ABK1) \cdot ABK2) \cdot (\overline{A14} \cdot A13 + A14 \cdot \overline{A13}) + AY \cdot IND \cdot$$
$$\overline{ABK3} \cdot (\overline{ABK2} \cdot \overline{ABK1} \cdot A15 + \overline{ABK2} \cdot ABK1 + ABK2 \cdot$$
$$\overline{ABK1} \cdot \overline{A15}) \cdot \overline{A14} + AY \cdot \overline{IND} \cdot ABK1 \cdot ABK2 \cdot \overline{ABK3} \cdot$$
$$(\overline{A15} \cdot \overline{A14} \cdot A13 + A15 \cdot \overline{A14} \cdot \overline{A13}) + AY \cdot IND \cdot$$
$$\overline{ABK3} \cdot ABK2 \cdot \overline{A15} \cdot ABK1 + A15 \cdot \overline{ABK1}ABK1) \cdot (\overline{A14} \cdot$$
$$\overline{A13} + A14 \cdot \overline{A13}))$$

$$PCAS5, 7, = (AY \cdot \overline{IND} \cdot \overline{ABK3} \cdot (ABK1 \cdot \overline{ABK2} + \quad (5)$$
$$\overline{ABK1} \cdot \overline{ABK2}) \cdot (\overline{A15} \cdot A14 \cdot A13 + A15 \cdot \overline{A14} \cdot$$
$$\overline{A13}) + AY \cdot IND \cdot \overline{ABK3} \cdot (\overline{ABK2} \cdot \overline{ABK1} \cdot A15 +$$
$$\overline{ABK2} \cdot ABK1 + ABK2 \cdot \overline{ABK1} \cdot \overline{A15}) \cdot A14 + AY \cdot$$
$$\overline{IND} \cdot ABK1 \cdot ABK2 \cdot \overline{ABK3} \cdot (\overline{A15} \cdot A14) + AY \cdot$$
$$IND \cdot \overline{ABK3} \cdot ABK2 \cdot (\overline{A15} \cdot ABK1 + A15 \cdot \overline{ABK1}) \cdot$$
$$(\overline{A14} \cdot A13 + A14 \cdot \overline{A13}))$$

In effect these ROMs are programmed to allow selection of predetermined rows in the memory, based on the address signals $A_{10}$, $A_{13}$, $A_{14}$ and $A_{15}$ (ignoring for a moment the contribution of the $\overline{RAS}$ signals and the other signals appearing in the equations).

The outputs of the $\overline{CAS}$ ROMs 127 and 128 are coupled to the register 131. Register 131 is a commercially available register which permits the enabling of output signals (Part No. 374). During accessing of the memory the various $\overline{CAS}$ signals ($\overline{CAS\ 0}$ through $\overline{CAS\ 7}$) are coupled to the memory of FIG. 6 to permit selection of the appropriate memory devices. The signal USELB from $\overline{CAS}$ ROM 127 through register 131 selects either the A bus or B bus. This signal is coupled to the multiplexers 43a and 43b of FIG. 3.

During normal operation, the multiplexer 130 selects the bank switching signals BCKSW 1 through BCKSW 4. These four signals (or alternatively four signals from the A bus) provide four of the inputs (address signals) to the ROM 132. The other inputs to this ROM are the DHIRES, Z PAGE, PA8, PA15, RFSH (refresh), and $\overline{AY}$ signals. These address signals select the RAS 0, 3; RAS 1, 2; RAS 4, 5 and RAS 6, 7 signals. The ROM 132 is programmed to implement the following four equations.

$$PRAS0, 3 = \overline{AY} \cdot (\overline{DHIRES} + RFSH) + (ABK4 \cdot (Z\ Page \cdot \quad (6)$$
$$\overline{PA8})) + ABK1 \cdot ABK2 \cdot ABK3) \cdot AY$$

$$PRAS1, 2 = \overline{AY} \cdot (DHIRES + RFSH) + AY \cdot (\overline{ABK1} \cdot \quad (7)$$
$$\overline{ABK2} \cdot \overline{ABK3} \cdot (ABK4 \cdot (ZPAGE \cdot \overline{PA8}) \cdot \overline{PA15}) + ABK1 \cdot$$
$$ABK2 \cdot ABK3) + AY \cdot \overline{ABK3} \cdot (\overline{ABK1} \cdot ABK2 \cdot ABK4 \cdot$$
$$(ZPAGE \cdot \overline{PA8}) \cdot PA15 + ABK1 \cdot ABK2 \cdot (ABK4 \cdot$$
$$(ZPAGE \cdot \overline{PA8}) \cdot \overline{PA15})$$

$$PRAS4, 5 = RFSH \cdot \overline{AY} + AY \cdot \overline{ABK2} \cdot \quad (8)$$
$$\overline{ABK3} \cdot (\overline{ABK1} \cdot ABK4 \cdot (ZPAGE \cdot \overline{PA8}) \cdot$$

-continued $$PA15 + \overline{ABK1} \cdot (ABK4 \cdot (ZPAGE \cdot \overline{PA8}) \cdot \overline{PA15})$$

$$PRAS6, 7 = RFSH \cdot \overline{AY} + AY \cdot \overline{ABK3} \cdot (ABK1 \cdot \quad (9)$$

$$\overline{ABK2} \cdot ABK4 \cdot (ZPAGE \cdot \overline{PA8}) \cdot PA15 + \overline{ABK1} \cdot$$

$$ABK2 \cdot (ABK4 \cdot (ZPAGE \cdot \overline{PA8}) \cdot \overline{PA15})$$

Thus, the bank switching signals (along with the other input signals to ROM 132) select predetermined rows in memory in conjunction with the $\overline{CAS}$ signals.

The output signals of the ROM 132 are coupled through the NAND gates 142, 143, 144 and 145 to the memory. The other input terminals of these gates receive the RAS timing signal. In this manner, the output signals of the ROM 132 are clocked through the gates 142 through 145 to provide the $\overline{RAS}$ signals shown in FIGS. 5 and 6.

An important feature to the presently described computer is provided by the circuitry shown within the dotted line 146. The AND gate 148 receives, at its input terminals, the DA7, A$_{12}$, and C$_3$ signals. The NOR gate 149 receives the zero page and A$_{15}$ signal. The output of gate 149 provides one input to the gate 148 and also one input to the AND gate 150. The output of gate 148 provides another input signal to gate 150 and this signal (line 153) is one of the two control signals coupled to the multiplexer 130. The AND gates 150 and 151 also receive a SYNC signal and the $\phi_0$ signal. The output of the gates 150 and 151 are coupled to a NOR gate 152 with the output of the gate 152 (line 154) coupled to the other control terminal of the multiplexer 130.

The gates 150, 151 and 152 effectively form a clock for multiplexer/register 130 (multiplexer 130 is a commercial part, Part No. 399, which effectively is a register/multiplexer). This selects the lower four input lines to the multiplexer 130. However, because of the synchronization signal applied to gate 151, the multiplexer 130 selects the bank switching signals each time an OP code is fetched by the CPU.

To understand the operation of the circuit shown within the dotted line 146 it should be recalled that the memory of FIG. 6 provides a 16-bit output. As mentioned, during certain display modes, 16-bits/msec. are needed for display purposes. In nondisplay modes, only 8-bits are required, particularly for interaction with the CPU. When the memory is addressed by the CPU during the indirect addressing modes the data on the A bus is not ordinarily used. However, with the circuitry shown within the dotted line 146, this otherwise "unused" data is put to use to provide the equivalent of the bank switching signals through multiplexer 130.

Whenever the CPU selects a predetermined range of addresses, the multiplexer 130 selects the equivalent of the bank switching signals from the A bus provided DA7 is high. (This occurs when addressing as zero page the address space —1800 through 1FFF.) Once the signal on line 153 is high it is latched through gates 150, 151 and 152 causing the multiplexer 130 to select the four bits from the A bus (assuming the timing signals are high). Even if the next reference from the CPU is not to this special address range, the multiplexer 130 nonetheless remains latched with the four bits from the data bus. Once the SYN pulse drops, however, which is an indication that an OP code is being fetched, the signal on line 154 rises in potential, causing the multiplexer to switch back to the bank switching signals.

Effectively, what occurs is that when the CPU selects this special address range, (and provided DA7 is high) the bits DA0 through DA3 which are stored in memory, cause a remapping, that is, the address from the CPU accesses a different part of the memory. With the fetching of each OP code, the mapping automatically returns to the bank switching signals. Importantly, the remapping, which occurs is controlled by the bits stored in the RAM (DA$\phi$ through DA3). Thus, with the remapping information stored in RAM, toggling can occur between different portions of the memory without requiring bank switching signals, or the like from the CPU. This enhances the CPU's performance since CPU time is not used for remapping. Additionally, it provides an easy tool for programming.

For some program languages it is desirable to separate data and the program into separate portions of the memory. For example, the 128K memory can be divided into two 64K memories, one for program and one for data. Switching can occur between these memory portions without the generation of bank switching signals by the CPU with the above described circuit. This arrangement is particularly useful when using the Pascal program language.

DISPLAY SUBSYSTEM

Figure 8:
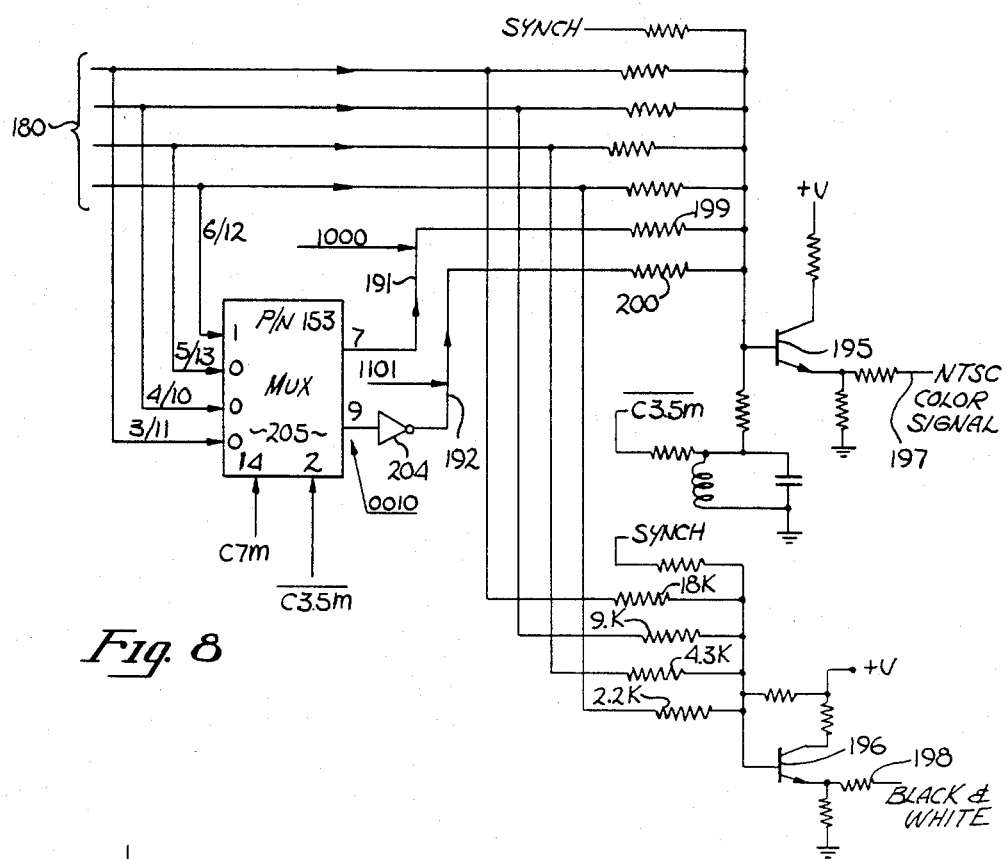

The display subsystem 48 of FIG. 1 receives data from the A bus and B bus and converts the data into video signals which may be used for displaying alphanumeric characters or other images on a standard raster scanned cathode ray tube display. The display subsystem 48 specifically generates on line 197, a standard NTSC color video signal and a video black and white video signal on line 198 (FIG. 8). This display subsystem, in addition to other inputs, receives a synchronization signal, and several clocking signals. For sake of simplicity, the standard color reference signal of 3.579545 MHz is shown as C3.5M. Twice this frequency and four times this frequency are shown as C7 M and C14M, respectively.

Figure 9:
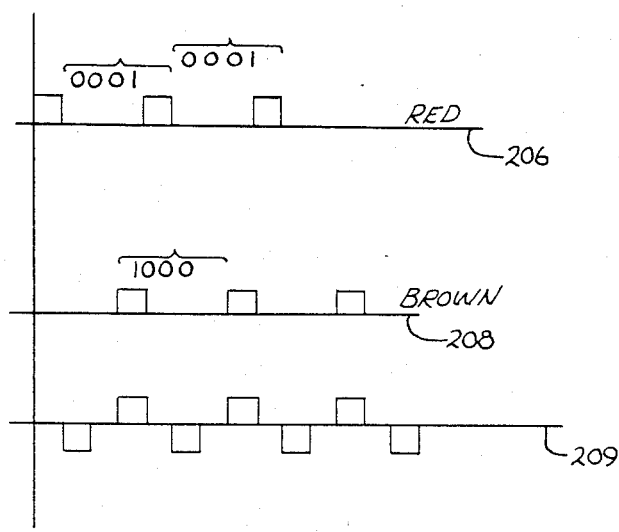
FIG. 9 is a graph of several waveforms used to describe a prior art circuit and the circuit of FIG. 8.

Before describing the details of the display subsystem 48, a discussion of a prior art display system will be helpful in understanding the present display subsystem. In U.S. Pat. No. 4,136,359, a video display system is described which is implemented in a commercially available computer, Apple-II, sold by Apple Computer, Inc., of Cupertino, Calif. In this system, 4-bit digital words are shifted in parallel into a shift register These words are then circulated in the shift register at 14 MHz to define a waveform having components at 3.5 MHz. Referring to FIG. 9, line 206, assume that the digital word 0001 is placed in the shift register and circulated at a rate of 14 MHz. The resultant signal which has a component of 3.5 MHz is shown on line 206. The phase relationship of this component to the 3.5 MHz reference signal determines the color of the resultant video signal. This relationship is changed by changing the 4-bit word placed in the shift register. As explained in the above-referenced patent, if the signal 1000 is placed in the register and circulated, the resultant phase relationship of the 3.5 MHz component results in the color brown, this signal is shown on line 208. With this prior art technique, the luminance was determined by the DC component of the signals such as shown on lines 206 and 208.

The display subsystem 48 of FIG. 1 also uses 4-bit words to generate the various color signals in a manner somewhat similar to the above-described system. Referring to FIG. 8 4-bit words representative of colors (16 possible colors) are coupled to the bus 180 (The generation of these words shall be described in detail in conjunction with FIG. 7.) Instead of using a shift register which circulates the 4-bit word, the same result is achieved by using a multiplexer 205 which sequentially selects each of the lines of the bus 180. The signals on bus 180 also provide a luminance signal and a black and white video signal with a gray scale.

The 4 lines of the bus 180 are coupled to multiplexer 205; this multiplexer also receives the C7M and the $\overline{C3M}/$ timing signals (again, Commercial Part No. 135 is used with the pin connections shown in FIG. 8). These two timing signals cause each of the four lines to be sequentially selected and coupled to line 191. (Note that the order in which each of the lines of the bus 180 is selected does not change.)

In effect, the multiplexer operates to serialize the parallel signal from bus 180. Assume for sake of explanation that the digital signals on bus 180 are 1000 as indicated in FIG. 8. The signal on line 191 will then be 10001000 .... The output of the multiplexer 205 coupled to the input of the inverter 204 also receives in a sequential order, the signals from bus 180, however, in a different order. For the example shown, the input to inverter 204 is 00100010 .... After inversion, this results in the signal 11011101 ... on line 192. Effectively, the signals on lines 191 and 192 are added by resistors 199 and 200. The resultant waveform is an AC signal (no DC component) shown in FIG. 9 on line 209. Thus, with the described circuit, a chroma signal is generated, having a predetermined phase relationship to the 3.5 MHz color reference signal. This phase relationship which is varied by changing the signals on bus 180 determines the color of the video signal on line 197.

In the prior art display discussed above, the DC component of the color signal determines the luminance. In the present invention, the signals on bus 180 are coupled to the base of transistor 195, consists of an AC signal from resistors 199 and 200, and the luminance level also determined by the signals on bus 180. These inputs to transistor 195, along with the $\overline{C3.5M}$ signal, generate a NTSC color signal on line 197 of improved quality when compared to the discussed prior art system.

In some cases, the signals on bus 180 are all binary ones or all binary zeros. When this occurs, there is no AC component from resistors 199 and 200 (no color signal) and the resultant signal on line 197 is either "black" or "white".

The lines of bus 180 are also coupled through resistors to the base of a transistor 196. Each of these resistors have a different value to provide a "weighting" to the binary signal. This weighting is used for non-color displays to provide "gray" shades as opposed to having a display with only black and white. The binary signals on bus 180 drive the transistor 196 to provide a video signal on line 198. RGB is generated with weighted sums of these same five signals.

Figure 7:
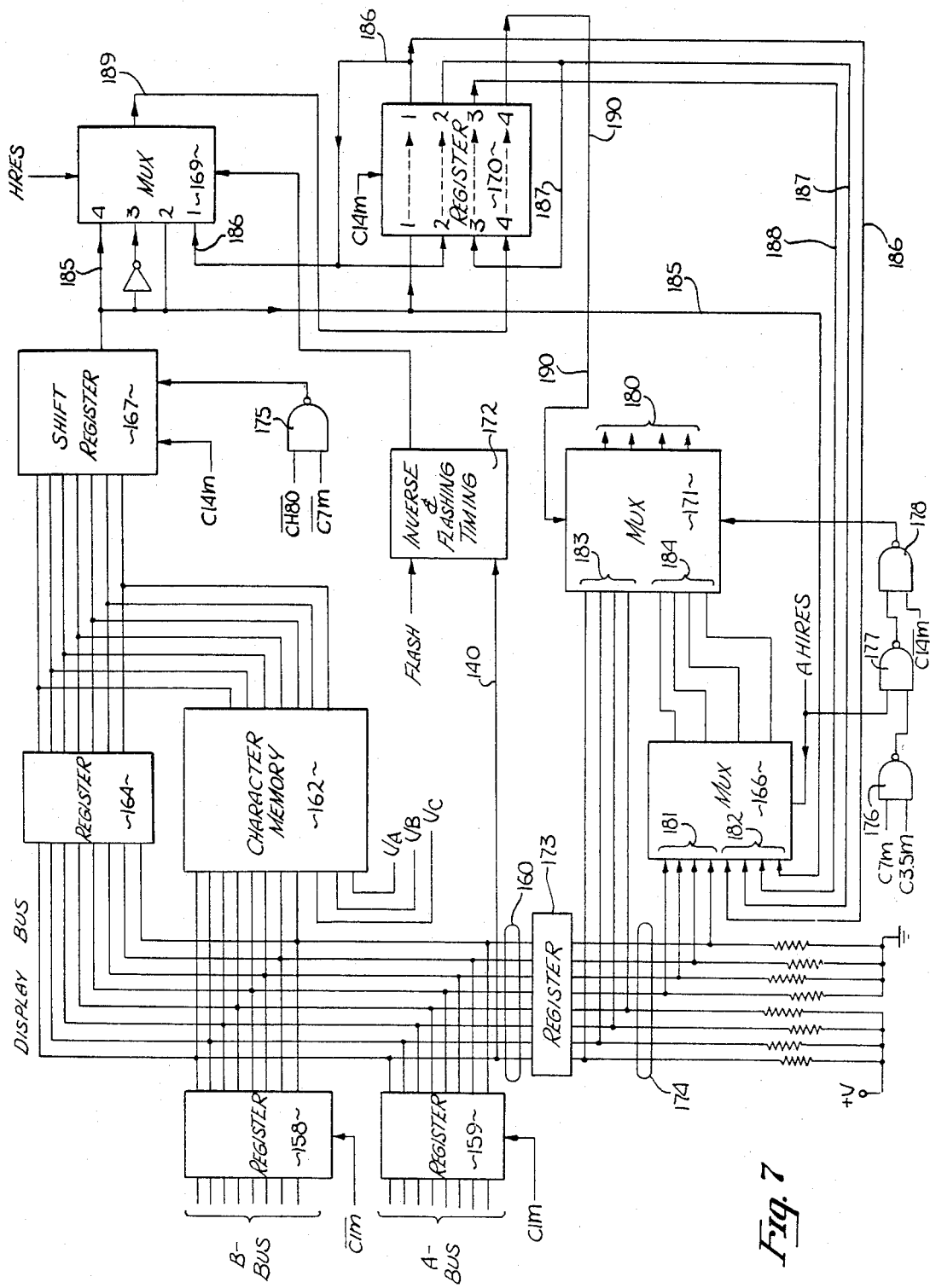
FIGS. 7 and 8 illustrate the display subsystem of the invented computer.

Referring now to FIG. 7, data from memory is coupled from the A bus and B bus to registers 159 and 158, respectively. These registers are clocked by the 1 MHz clocking signal and its complement, thus permitting the sequential transfer of 8-bit words every 0.5 msec. As will be described, in some display modes the data is transferred at the 2 MHz rate, and in other display modes, at a 1 MHz rate.

The registers 158 and 159 are coupled to an 8 line display bus 160. This display bus transfers data to registers 164 and 173, and also addresses to a memory 162. The registers 164 and 173 and memory 162 are enabled during specific display modes as will be apparent.

The character memory 162, in the presently preferred embodiment, is a random-access memory which stores patterns representative of alpha-numeric characters. Each time the computer is powered up, the character information is transferred from the ROM 50 into the character memory 162 during an initialization period. During character display modes, the signals from the display bus 160 are addresses, identifying particular alpha-numeric characters stored within the character memory 160. The vertical counter signals $V_A$, $V_B$, and $V_C$ (previously discussed in conjunction with adder 121 of FIG. 4) identify the particular line in each character which is to be displayed. Thus, the generation of the digital signals representative of each of the characters occurs in an ordinary manner. The 7-bit signal representative of each line of each character (memory output) is coupled to the shift register 167. Through timing signals not shown, either the register 164 or the character memory 162 is selected to allow the shift register 167 to receive either data directly from the A bus or B bus, or alpha-numeric character information from the memory 162.

The 7-bits of information from either memory 162 or register 164 are serialized by the shift register 167 either at a 7 MHz rate or 14 MHz rate, depending upon the display mode. The serialized data is coupled by line 185 to the multiplexer 169, pins 1 and 4. The inverse of this data is also coupled to multiplexer 169, pin 3. Line 185 is also coupled as one input to the multiplexer 166 and to the register 170 (input 1).

The output 1 of register 170 (line 186) is coupled to the multiplexer 169, pin 1; to register 170 (input 2); and to multiplexer 166. Output 2 of register 170 (line 187) is coupled to input 3 of register 170 and also to multiplexer 166. Output 3 of register 170 (line 187) provides a third input to the multiplexer 166. Input 4 of the register 170 receives the output of the multiplexer 169 (line 189). Output 4 of register 120 (line 190) provides one control signal for the multiplexer 171.

The multiplexer 171 selects either the four lines of bus 183 or the four lines of bus 184. The output of multiplexer 171, bus 180, provides the 4-bit signal discussed in conjunction with FIG. 8. During one of the high resolution display modes (AHIRES), the multiplexer 171 is controlled by a timing signal from the output of the gate 178.

The multiplexer 166 selects either the lines of bus 181 or bus 182. The output of this multiplexer provides the signals for the bus 184. In all but the AHIRES display mode, multiplexer 166 selects bus 181. Thus, typically, the multiplexer 171 receives the signals from bus 174.

For purposes of description above, and also for purposes of explaining for some of the display modes below a simplifying assumption has been made. The signals coupled to the bus 180 by multiplexer 171, for most modes, are controlled by the serialized signal on line 190. This serialized signal is in sychronization with the C7M or C14M clocking signals. The multiplexer 205 of FIG. 8, which as described above, does the "spinning" for the parallel digital signal on bus 180, operates in sychronization with the multiplexer 171. In the description above, and except when otherwise noted below, it is assumed that, by way of example, if the multiplexer 171 is coupling all binary ones and zeros onto bus 180, the signal on line 191 will be either ones or zeros. Also for this condition the signal on line 192 will be all binary zeros or ones, and thus, no AC signal is generated at the base of transistor 195. However, as actually implemented, there is a "phase" difference between the clocking of the multiplexer 171 when compared to the sampling of the signals from bus 180 by the multiplexer 205. This results in a first constant AC signal on the gate of transistor 195 even when it appears that all binary ones are on bus 180, and a second constant AC signal when all binary zeros are on the bus 180. Thus, in this specification, when it states that "black" or "white" signals are being generated, instead, as currently implemented, two constant colors are generated on a color display. Where a true black and white is desired, color suppression is introduced such as through the color burst signal.

The circuit of FIG. 7, along with the circuit of FIG. 8, provides the capability for several distinct display modes. The first of these modes provides a display consisting of 40 characters (or spaces) per horizontal line. This requires a data rate of 8-bits/MHz or half the data rate the memory is capable of delivering. In this mode, data is loaded from the A bus during every other 0.5μ sec period. (B bus is not used during this mode.) This data addresses the character memory 162, and along with the signals $V_A$, $V_B$ and $V_C$, provides the appropriate character line (7-bits) to the shift register 167. During this mode, registers 164 and 173 are disabled. The shift register 167 for this mode shifts the data at a data rate of 7 MHz (note $\overline{CH80}$ is high, allowing the 7 MHz signal from gate 175 to control the shift register 167). Each 7-bit signal is shifted serially onto line 185 and then to line 189 since multiplexer 169 selects pin 4. The data is shifted through the register 170 onto line 190. The serial binary signal on line 190 causes the selection of buses 183 or 184.

The four lines of bus 183 during this mode are coupled to +V (register 173 is disabled); therefore the selection of bus 184 provides four binary ones. The selection of bus 184 provides four binary zeros through bus 181. Thus, the serial binary signal on line 190 provides either all binary ones or all binary zeros to bus 180. As discussed the circuit of FIG. 8 will provide a black and white display with 40 characters per line.

If the inverse and flashing timing means 172 is selected, each time the shift register 167 is loaded, multiplexer 169 shifts between pins 3 and 4. This causes the characters to change from white characters on a black background to black characters on a white background, and so on.

During the 80 character per line display mode, the registers 158 and 159 are each loaded during sequential 0.5μ sec periods (this utilizes the 2 MHz cycle rate previously discussed). The shift register 167 shifts the character data from memory 162 at a 14 MHz rate. The serialized data at the 14 MHz rate is shifted through the register 170 and again controls the multiplexer 171 as previously described. (Note that register 170 is always clocked at the 14 MHz rate.) Flashing again can be obtained as previously discussed.

In another alpha-numeric character display mode, the background of each character may be in one color and the character itself (foreground) in another color. This mode provides 40 characters per line. The character identification (address for RAM 162), is furnished on the A bus to register 159 at a frequency of 1 MHz. The color information (background color and foreground color) is furnished on the B bus as two 4-bit words to register 158. In the manner previously described, the address from register 159 selects the appropriate character from memory 162 and provides this information to shift register 167. The color information from the B bus is transferred to register 173. For purposes of explanation, assume that the 4-bits identifying the color red for the background are on bus 184 (from register 173 and multiplexer 166) and that 4-bits representing the color blue for the foreground are on bus 183. (Note that when register 173 is enabled, the signals from the register override the binary ones and zeros which otherwise appear on the lines of bus 174.) The serial binary signal representative of the character itself on line 190, selects either the color blue from bus 183 for the character itself or the color red from bus 184 for the background. The digital signals representative of these colors are transferred to bus 180 and provide the color data to the circuit of FIG. 8. For black and white displays, a "gray" scale is provided through the weighting circuit associated with transistor 196 of FIG. 8. Again, the multiplexer 169 may, through the timing means 172, alternate between the signal of line 185 and its inverse, which will have the effect of interchanging the foreground and background colors.

During the high resolution graphics modes, the character memory 162 is not used, but rather, data from the memory directly provides pattern information for display. This requires more mapping of data from within the main memory since new data is required for each line of the display. (Note that when characters are displayed, the character memory 162 provides the different signals required for the 8 lines of each character row. During these high resolution modes, the register 164 is enabled and the character memory 162 is disabled. Thus, the data from the A bus and B bus is shifted into the shift register 167. In these modes, the "HRES" signal to multiplexer 169 causes this multiplexer to select between pins 1 and 2. Pin 2 provides the signal directly from the shift register 167 while the signal on pin 1 is effectively the signal on line 185 delayed by one period of the C14M signal. This delay occurs through the register 170 from input 2 to output 2 since register 170 is clocked at C14M.

During a first graphics mode, data from the display bus 160 is loaded into shift register 167 at the rate of 7-bits/MHz. The data is serialized on line 185 and in the manner previously described for displaying characters, controls the selection of all binary ones and all binary zeros through the multiplexer 171. Note, as mentioned before, in the presently preferred embodiment, unless color suppression is used, this will not result in a black and white display, but rather a two-color display. If a high bit is present on line 140 of the display bus, the inverse and flashing timing means 172 causes the multiplexer 169 to alternate between pins 1 and 2. This switching occurs at a 1 MHz rate and provides a phase shift for every other 7-bits of data coupled to the multiplexer 171 on line 190. This results in an additional color being generated on the display for every other 7-bits of data.

For the above-described graphics modes when shift register 161 is shifting at a 7 MHz rate, 8-bits may be coupled to the bus 160 during each period. Specifically, as in the case of the differing background and foreground colors for the 40 character per line display mode, two 4-bit color words are shifted into register 173 at a rate of 1 MHz. Then, the multiplexer 171 selects between two predetermined colors on buses 183 and 184. Note these colors can be changed at a 1 MHz rate.

In an additional color mode identified as "AHIRES", multiplexer 171 operates under the control of gates 176, 177 and 178. In effect, multiplexer 171 selects bus 184 and latches the signals on this bus every four cycles of the C14M clock. Data is shifted into the shift register 167 from the A bus and B bus every $0.5\mu$ sec the register 167 operates under the control of the C14M signal. Each data bit on line 185 is shifted first to line 186, then to line 187 and finally to line 188. These lines are coupled to the multiplexer 171 through multiplexer 166 which selects bus 182 since AHIRES is high. In effect, what occurs is that 4-bit color words are serialized onto line 185 and then brought back into parallel on bus 182. Since multiplexer 171 latches the signals on bus 184 every four cycles of the C14M signal, a new color word is generated at a 3.5 MHz rate on the bus 180. The resultant display is 140 by 192 colored blocks wherein each block can be any one of 16 colors.

In the last display mode, typically used with color suppression, data is shifted into the shift register 167 from the display bus at the rate of 14-bits/MHz. The data is serialized onto line 185 and controls the selection of either all binary ones or all zeros through multiplexer 171. This provides the highest resolution graphics display for the system.

Thus, a microcomputer with video display capability has been described. The computer is fabricated from commercially available parts and provides high utilization of these parts. Numerous existing programs including many of those which operate on the Apple-II computer, may be employed in the above-described computer.

I claim:

1. In a digitally controlled, raster scanned, video display for use with a microcomputer, or the like, which display provides color images in response to chroma signals having predetermined phase relationships to a reference signal of frequency (f), a circuit for providing a digitally controlled chroma signal comprising:

digital word generation means for generating predetermined digital signals;

serializing means coupled to said generation means for repeating said word in a serial form at a predetermined frequency so as to provide frequency components at said frequency f;

converting means, coupled to said serializing means for converting outputs from said serializing means to an AC signal;

whereby a video chroma signal is generated.

2. The circuit defined by claim 1 including additional circuit means coupled to said digital word generation means for providing a DC luminance signal.

3. The circuit defined by claim 1 wherein said digital words are coupled to a resistive weighting network for providing a gray scale video signal.

4. The circuit defined by claim 1 wherein said digital words are 4-bit words and wherein said predetermined frequency is equal to 4f.

5. The circuit defined by claim 4 wherein said serializing means comprises a multiplexer which is controlled in sychronization with said frequency f.

6. The circuit defined by claim 5 wherein said converting means includes an inverter coupled to an output of said multiplexer.

7. The circuit defined by claim 6 including additional circuit means coupled to said digital word generation means for providing a DC luminance signal.

8. The circuit defined by claim 1 wherein said digital word generation means comprises:

a source of digital data for controlling said display;

a first register coupled to receive data from said source of data;

a multiplexer for selecting between two buses, the output of said multiplexer coupled to said serializing means, said buses coupled to said first register, a shift register coupled to receive data from said source of data, said shift register providing a serialized digital signal for controlling said multiplexer.

9. The circuit defined by claim 8 including a character memory for storing data representative of alpha numeric characters, said memory coupled to receive address from said source of data, the output of said memory coupled to said shift register.

10. The circuit defined by claim 9 wherein when said first register is disabled, one of said two buses is clamped to provide all binary ones, and the other of said buses provides all binary zeros.

11. The circuit defined by claim 10 wherein said shift register is controlled by a plurality of clocking signals, all of which are synchronized with said frequency f.

* * * * *